Figure 1:
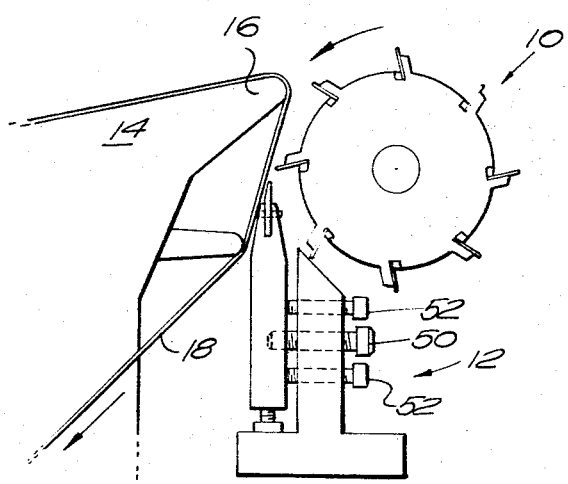

Aug. 1, 1967 W. J. HOLM 3,333,498
ROTARY FABRIC SHEARING CUTTER
Filed Feb. 19, 1964

INVENTOR.
WILLIAM J. HOLM
BY Morse + Altman
ATTORNEYS

United States Patent Office 3,333,498
Patented Aug. 1, 1967

3,333,498
ROTARY FABRIC SHEARING CUTTER
William J. Holm, Springfield, Vt., assignor to Parks & Woolson Machine Company, Springfield, Vt., a corporation of Vermont
Filed Feb. 19, 1964, Ser. No. 346,027
1 Claim. (Cl. 83—672)

This invention relates generally to rotary shearing devices of the sort used in cloth shearing machines and more particularly is directed towards improved rotary and fixed shearing members employing high speed steel blades. This invention also includes a novel method of fabricating cloth shearing devices of this type.

Cloth shearing machines normally employ a rotary cylindrical reel-like member carrying a number of shearing blades which co-act with a stationary ledger knife to shear to a uniform level fibers protruding from the surface of a cloth web passed close to the rotary member. In practice, the cloth is fed rapidly through the machine past the shearing devices in flat and open relation with the cloth being supported in proximity to the co-acting blades by means of a rest which solidly supports the cloth at the shearing line.

Heretofore, rotary cutters for cloth shearing machines have been difficult and expensive to manufacture by reason of the time and skill involved in shaping the blades and mounting them. The practice has been, heretofore, to employ a cylindrical supporting roller and to mount thereon the cutting elements which are preformed with the proper helix to conform to the supporting cylindrical surface. The blades have been relatively thick pieces of steel which have been preshaped, ground and tempered by separate operations prior to assembly on the roller. Attachment to the roller has been made by forming helical grooves in the outer cylindrical surface, setting the preshaped and tempered blades upright in the grooves lengthwise in a helical path over the surface of the roller and then fixing the blades into place as by peening the edges of the grooves so as to root the blades firmly to the roller.

Various problems accompany rotary shearing devices of this type. For example, because of the heat treatment and shaping operations required to provide the proper helical pitch to the blades, there is a limitation on the quality of the steel which may be employed in fabricating the cutting elements. Also, when the elements become worn or are damaged for any reason, it is a difficult task to replace or repair them. Furthermore, because of the way in which the elements are mounted to their supporting cylinder, there is a limit to the number of times that these elements can be replaced before the cylinder becomes so worn as to no longer properly support the cutting elements. In addition, cutting elements presently in use require lubrication and the oils employed for this purpose tend to stain the material which is being shorn. With some cutting blades streaks will appear on the surface of the cloth due to gradual disintegration of the cutting blades.

Accordingly, it is an object of the present invention to provide improvements in cloth shearing mechanisms.

Another object of this invention is to provide a rotary shearing device employing high-speed steel cutting elements.

Yet another object of this invention is to provide a rotary shearing member in which the cutting blades may be quickly and easily replaced without damage to the supporting cylinder.

A still further object of this invention is to provide a novel method for fabricating rotary shearing cutters.

More particularly, this invention is directed towards a rotary shearing device comprising a cylinder having attached thereto longitudinally flexible strips of high-speed steel which are mounted in fixed position by means of spaced helical ribs. The ribs are formed integral with the supporting cylinder and provide support for the steel strips which are laid along the faces of the ribs and attached thereto by silver soldering or the like. Grooves formed along the bases of the ribs may also be employed to properly seat the cutting elements.

This invention also features a novel method for fabricating rotary shearing cutters which method involves the steps of preforming fixed helical supports on a rotary cylindrical drum, then conforming a length of flexible high-speed steel to the leading face of each of the ribs and then fixing each section of flexible strip to its supporting ribs. This invention also features a novel ledger knife employing a cutting element fabricated from a length of longitudinally flexible high-speed steel.

Figure 2:
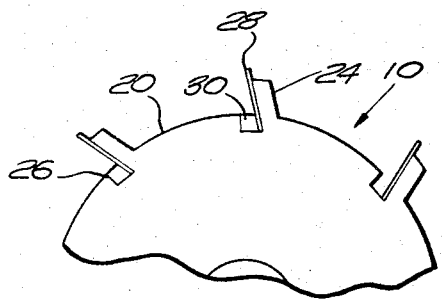
Figure 3:
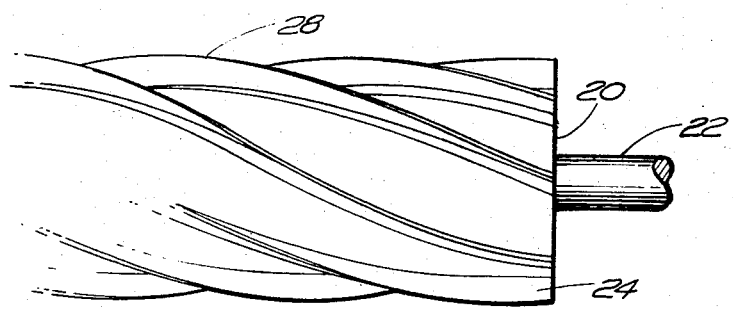
Figure 4:
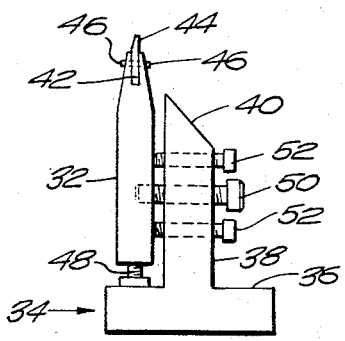
Figure 5:
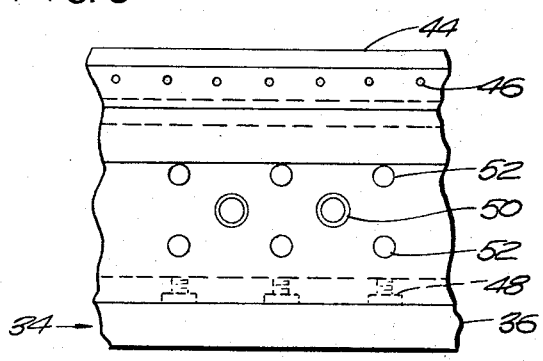

But these and other features of the invention, along with further objects and advantages thereof, will become more fully apparent from the following detailed description of preferred embodiments of the invention, with reference being made to the accompanying drawings, in which:

FIG. 1 is a view in side elevation of a rotary shearing mechanism including the rotary shear, the ledger knife and the rest, FIG. 2 is a fragmentary view on an enlarged scale showing the rotary cutting member of FIG. 1, FIG. 3 is a fragmentary view in front elevation of a rotary cutting member made according to the invention, FIG. 4 is an end elevation of a ledger knife made according to the invention, and, FIG. 5 is a detailed front elevation of the ledger knife shown in FIG. 4.

Referring now to the drawings, there is illustrated in FIG. 1 a fabric shearing station comprising a power driven rotary shearing reel 10, a ledger knife assembly 12 and a rest 14 having one or more noses 16 over which a flat, open web of fabric 18 is roven to carry the surface of the web in close proximity to the cooperating reel and ledger knife.

The reel 10 comprises a cylindrical body portion 20 supported at its ends by gudgeons 22. The cylindrical body portion 20 is formed with a plurality of integral ribs 24 which extend in evenly spaced helical paths lengthwise about the outer cylindrical surface. In practice, each of the ribs 24 is pitched forwardly at a small angle and at the base of each rib at the forward or left-hand side as viewed in FIG. 2 there is formed a channel 26 coextensive with each of the ribs.

Mounted against the forward face of each of the ribs and having its lower edge seated in the channels 26 is a blade 28 cut from a strip of thin longitudinally flexible high-speed steel. This blade preferably is mounted to the face of the rib 24 by silver soldering or the like and a copper ribbon 30 may be swaged into the channel 26 to firmly seat each of the blades. The blades 28 may be cut from a roll or length of the flexible steel in proper lengths and merely laid against the face of a rib and then secured in fixed position. There is no need to preform the strip into a fixed helical shape since it will assume the fixed contour of the supporting rib 24 by reason of its longitudinal flexibility.

Various types of metals are available for use as cutting elements for the reel 10. For example, high carbon steels, steel alloys of tungsten and vanadium, Carboloy, carbides, stellite, and the like may be obtained in flexible strip form and cut into blade sections. Typical hardness ratings for alloys of this type is in the 60 to 63 range on the Rockwell C scale.

A number of advantages are presented by the use of blades formed from longitudinally flexible strips and fixed to the cylindrical member. These advantages include a lowering of the critical temperature at which the blades operate. This permits operation of the shearing machine at higher speeds and also eliminates the necessity for lubricating the blades as is a common practice with softer metals. With no lubricants present there is no risk of staining the material which occurs frequently with lubricated blades. Furthermore, the temper of the high-speed steel cutting blades is not affected at temperatures up to and exceeding 110°.

By first forming integral helical ribs and channels in a cylindrical support and then mounting thereto blades formed from lengths of longitudinally flexible high-speed steel, the entire fabrication of a reel is greatly expedited and simplified since there is no need to preform the cutting element into an exact fixed helical contour. Furthermore, the cutting elements will enjoy a long useful life and their replacement, when it becomes necessary, is a much easier and quicker task than is the case with cutting blades of a fixed configuration. It is necessary only to remove the copper ribbon 30 from the channels 26 and then detach the strip 28 from its supporting rib. New strips may then be mounted on the cylindrical member 20 in the same fashion as before.

It will, of course, be understood that, once the normally flexible strip is mounted in place, its contour will be fixed and unyielding by reason of its attachment to the rib.

Referring now more particularly to FIGS. 4 and 5, there is illustrated a novel ledger knife assembly 12 embodying features of the invention. The assembly comprises a casting or holder 32 adjustably mounted on a support 34 which has a base portion 36 and an upright center portion 38, the upper portion of which is beveled at 40 to provide clearance for the reel 10 as best shown in FIG. 1. The holder 32 is machined along its upper edge into a dovetailed slot 42 extending lengthwise of the entire casting.

Mounted in the slot 42 is a ledger knife 44 which has been cut from a length of longitudinally flexible high speed steel similar to that employed in the blades 28 described in connection with the reel 10. The knife 44 may be of uniform rectangular cross-section or may be somewhat wedge-shaped in cross-section to match the cross-section of the slot 42 for optimum fit. In any event, the upper marginal edge of the knife 44 extends from the upper edge of the holder 32. Also the opposing sides of the upper portion of the holder are tapered for reduced thickness whereby that portion of the ledger may project between the web 18 and the reel 10.

Along the sides of the upper portion of the holder 32 is a series of setscrews 46 for locking the knife firmly in position. The holder itself is mounted for vertical and horizontal adjustment by means of a series of screws 48 threaded along the lower edge of the casting and bearing against the base 36 of the support 34. It will be understood that adjustment of the screws 46 will set the height of the knife 44 and also bring the knife into proper alignment with the blades of the reel. In order to adjust the ledger knife to and away from the cloth and also to vary the angle of the knife, screws 50 and 52 are provided. The screws are threaded through the center portion 38 of the base support 34 with the center screws 50 being also threaded to the holder 32 while the upper and lower adjusting screws 52 have their ends bearing against the rear surface of the holder. With this arrangement, the several sets of screws may be adjusted to vary the angle of the holder and the blade and also to vary its position with respect to the surface of the cloth whereby a very precise cutting depth may be selected.

While the invention has been described with particular reference to the illustrated embodiments, it will be understood that numerous modifications thereto will appear to those skilled in the art.

For example, in place of a tubular or solid cylindrical support for the blades, a skeletal type of cylindrical reel may be employed such as is used in air draft revolvers and the like. Also, various high speed metals other than those specified can be used to advantage in practicing the invention.

Also, it will be understood that the above description and accompanying drawings may be taken as illustrative of the invention and not in a limiting sense.

Having thus described the invention, what I claim and desire to obtain by Letters Patent of the United States is:

A fabric shearing reel, comprising
  (a) a cylindrical body adapted to be rotated about its longitudinal axis,
  (b) a plurality of evenly spaced ribs extending helically about the outer surface of said body each with a smooth face on the leading side thereof formed generally radial to said body with a slight forward pitch,
  (c) said body being formed with a plurality of evenly spaced grooves extending helically about the outer surface of said body at the base of said ribs,
  (d) a thin strip of longitudinally flexible metal of high hardness throughout laid flatwise against a face of each of said ribs and fixed thereto, each strip having its inner edge mounted along a groove adjacent to the supporting rib,
  (e) said strip being wider than the combined height of said rib and depth of said groove whereby the outer edge of said strip will extend radially clear of said rib,
  (f) and a ribbon of relatively soft metal compressed into said channels together with the inner edges of said strips to hold said flexible strip in position.

References Cited
UNITED STATES PATENTS

| | | | |
|---|---|---|---|
| 2,020,996 | 11/1935 | Crafts | 83—342 X |
| 2,026,533 | 1/1936 | Haupt | 83—342 |
| 2,732,608 | 1/1956 | Richardson | 83—349 X |
| 3,190,163 | 6/1965 | Bradley | 83—672 |

FOREIGN PATENTS

| | | |
|---|---|---|
| 644,683 | 10/1950 | Great Britain. |

ANDREW R. JUHASZ, *Primary Examiner.*